(12) United States Patent
Al-Hader

(10) Patent No.: US 9,958,273 B2
(45) Date of Patent: May 1, 2018

(54) COMPUTER-IMPLEMENTED MAP OF ASSETS CONVERSION METHOD AND SYSTEM

(71) Applicant: Al Ain Distribution Company (AADC), Al Ain (AE)

(72) Inventor: Mahmoud Fawzi Al-Hader, Al Ain (AE)

(73) Assignee: Al Ain Distribution Company (AADC) (AE)

( * ) Notice: Subject to any disclaimer, the term of this patent is extended or adjusted under 35 U.S.C. 154(b) by 119 days.

(21) Appl. No.: 14/870,241

(22) Filed: Sep. 30, 2015

(65) Prior Publication Data
US 2017/0089703 A1    Mar. 30, 2017

(51) Int. Cl.
*G06T 11/00* (2006.01)
*G01C 21/00* (2006.01)
*G06T 11/20* (2006.01)

(52) U.S. Cl.
CPC .......... *G01C 21/005* (2013.01); *G06T 11/003* (2013.01); *G06T 11/206* (2013.01); *G06T 2207/10032* (2013.01); *G06T 2207/20021* (2013.01); *G06T 2207/30181* (2013.01)

(58) Field of Classification Search
None
See application file for complete search history.

(56) References Cited

U.S. PATENT DOCUMENTS

| 2008/0192053 A1* | 8/2008 | Howell | G06F 17/30241 345/427 |
| 2011/0148866 A1* | 6/2011 | Chu | G06T 15/04 345/419 |

\* cited by examiner

*Primary Examiner* — Delomia L Gilliard
(74) *Attorney, Agent, or Firm* — Hayes Soloway PC

(57) ABSTRACT

There is provided a computer-implemented coordinate conversion method for converting a first map of assets represented by first map coordinates based on a first projection system to a second map of assets represented by second map coordinates based on a second projection system, the method comprising obtaining transformation coefficients comprising first directional coefficients and rotation coefficients; converting the rotation coefficients into second directional coefficients; generating simplified transformation coefficients by adding the first and second directional coefficients and eliminating the rotation coefficients; generating the second map coordinates by converting the first map coordinates using the simplified transformation coefficients without any use of rotation coefficients; generating the second map of assets based on the second projection system using the second map coordinates; and providing user access to the generated map. There is also provided a system/computing device for doing the same.

22 Claims, 10 Drawing Sheets

| | | Terrestrial System | Satellite System |
|---|---|---|---|
| Geodetic Reference and Projections Parameters | Spheroid | Clarke 1880 | WGS84 |
| | Semi-major axis | 6,378,249.145 | 6,378,137.0 |
| | Flattening 1/f | 293.465 | 298.25722357 |
| | UTM Zone | 40N | 40N |
| | Central Meridian | E57 | E57 |
| | Scale Factor | 0.9996 | 0.9996 |
| | False Easting | 500,000 | 500,000 |
| | False Northing | 2,000,000 | 0 |

Fig. 4

COMPUTER-IMPLEMENTED MAP OF ASSETS CONVERSION METHOD AND SYSTEM

FIELD OF THE DISCLOSURE

The present invention relates to map conversion systems and methods and more particularly to a method and system for transforming geo-location coordinates from one geo-location projection system to another, and particularly from a satellite projection system to a local/terrestrial projection system and vice versa.

BACKGROUND OF THE DISCLOSURE

Maps and Geographic Information System (GIS) usually involve working with transformations from one format to another. This involves transformation of coordinates delivered by surveyor into a two dimensional (2D) system of a defined map projection.

During the commencement of new infrastructure projects in a city, development companies rely on geo-location coordinates related to assets provided by the town planning department (TPD). With advancement of technology, satellite projections of a particular area or a city or a country and many more can be obtained. Lately, most town planning departments (TPDs) are using a satellite projection system (World Geodetic System 1984 or WGS84) for the geo-location of city assets such as roads, buildings and may other land based assets and as such the geo-location coordinates of assets are represented using the satellite projection system. The reason is to uniform the assets information collection spatial reference to accommodate the surveying data collection techniques such as GPS, GLONASS, GNSS, Laser Scanning, Satellite Images. Such satellite projections vary from the actual terrestrial map obtained on earth, and as a consequence, there is a difference between the satellite and the terrestrial mappings of a particular area.

All services such as utility route approvals, contractor submissions, supply arrangements presented by development companies to the TPDs need to be represented using geo-location coordinates based on the satellite projection system. There is a substantial exchange of information related to the geo-location of assets between the development companies and the municipalities especially in route approvals and drawings update. This highlights the importance of having a consistency in the information exchanged between both parties.

Development companies still use Local/terrestrial projection systems (for example Nahrawan 1967, DTM C Dubai, Cassini Grid and the like) due to several technical issues which results in an inconsistency of the representation of geo-location coordinates of assets between the development companies and the TPD. An inaccurate conversion of asset coordinates from one geo-location system to another (in this case from local/terrestrial geo-location system used by the development companies to the satellite projection system used by the TPD or the opposite) results in mismatches and data discrepancies affecting the accuracy of information related to the location of assets exchanged between the development companies and the TPDs. This affects the chances and/or time frames in obtaining approvals by the development companies from the TPDs such as route approvals, asset development approvals in allocated utility corridors and the such. In this sense, the update of asset information life cycle status from design, commissioning to maintaining will be completely delayed and affected.

Traditional data conversion systems and method from satellite to terrestrial geo-location coordinates use and process rotation coefficients which makes them complex and results in an inaccurate conversion.

SUMMARY OF THE DISCLOSURE

In view of the foregoing disadvantages inherent in the prior-art and the needs as mentioned above, there is provided a system and method of transforming an existing map of assets from a first projection system to a second projection system that is adapted to include all advantages of the prior art and to overcome the drawbacks inherent in the prior art offering some added advantages.

As a first aspect of the invention, there is provided a method of transforming an existing map of assets from a first projection system to a second projection, the map of assets being represented by first projection coordinates according to the first projection system.

The method comprises obtaining transformation coefficients, where the transformation coefficients are adapted to transform the map of assets representation based on the first projection system into a map of assets representation based on the second projection system. The transformation coefficients represent shifts in directions, rotations and scale.

The method further comprises generating simplified transformation coefficients, the generation process comprising converting the rotation coefficients into additional directional coefficients and eliminating the rotation coefficients.

The method further comprises adding the additional directional coefficients representing the rotation coefficients to the existing directional coefficients.

The method further comprises transforming the map of assets representation based on the first projection system into the map of assets representation based on the second projection system using the simplified transformation coefficients which excludes any use of rotation coefficients. The map of assets representation based on the second projection system is represented by second projection coordinates.

In an embodiment of the invention, the method is a computer implemented method where at least a part of the steps are executed using a computer. Preferably, all the steps are computer generated.

As another aspect of the present invention, there is provided a system for transforming an existing map of assets from a first projection system to a second projection, the map of assets being represented by first projection coordinates according to the first projection system, the system comprising a computing device comprising a memory and a processor for carrying out the steps of:

obtaining transformation coefficients, where the transformation coefficients are adapted to transform the map of assets representation based the first projection system into a map of assets representation based on the second projection system, the transformation coefficients representing shifts in directions, rotations and scale;

generating simplified transformation coefficients, the generation process comprising converting the rotation coefficients into additional directional coefficients; and transforming the map of assets representation based on the first projection system into the map of assets representation based on the second projection system using the simplified transformation coefficients which excludes any use of rotation coefficients, the map of assets representation based the second projection system being represented by second projection coordinates.

As a further aspect of the invention, the present invention provides a computer program product comprising executable instructions which, when executed by one or more processors, cause the one or more processors to carry out the steps of the method in accordance with any one of the embodiments of the present invention.

In an embodiment of the invention, the first projection system is the satellite projection system and the second projection system is the local/terrestrial projection system.

In an embodiment of the invention, the first projection system is the local/terrestrial projection system and the second projection system is the satellite projection system.

In an embodiment of the invention, the generation of simplified transformation coefficients comprises setting the scale coefficient to 1.

In an embodiment of the invention, the conversion of the rotation coefficients into additional directional coefficients comprises:
- obtaining first reference coordinates representing a reference zone based on the first projection system, said first reference coordinates comprising first reference directional shift coefficients and reference rotation shift coefficients;
- obtaining second reference coordinates representing said same reference zone based on the local/terrestrial projection coordinates, said second reference coordinates comprising second reference directional shift coefficients;
- determining a reference directional shift difference between the first and second reference directional shift coefficients;
- generating a conversion equation or mathematical relationship between rotation coefficients and directional coefficients using the reference directional shift difference and the reference rotation shift coefficients, the conversion equation being adapted to convert the rotation coefficients into the additional directional coefficients;
- converting the rotation coefficients into the additional directional coefficients using the conversion equation/ mathematical relationship for.

In fact, the reference directional shift difference determined is the equivalent (in angles) of the reference rotation shift coefficients. The normalization of the mathematical relationship between the reference directional shift difference and the reference rotation shift coefficients can be use for the generation of the conversion equation.

In an embodiment of the invention, the rotation and directional coefficients comprise two components, a first component along a first axis and a second component along a second axis (for example, X and Y). Preferably, the first and second axes are orthogonal. In this case, the directional coefficients comprise a first directional coefficient along a first axis and a second directional coefficient along a second axis, and the rotation coefficients comprise a first rotation coefficient along the first axis and a second rotation coefficient along the second axis. In another embodiment, the coefficients comprise three components according to three orthogonal axes (example, X, Y and Z).

In an embodiment of the invention, the directional coefficients comprise a shift in easting direction coefficient and a shift in northing direction coefficient.

In an embodiment of the invention, the rotation coefficients comprise a rotation in easting direction coefficient and a rotation in northing direction coefficient. Once these rotation coefficients are converted into directional coefficients, the resulting additional directional coefficients comprise an additional easting shifting coefficient and an additional northing shifting coefficient which reflect the rotation in easting direction coefficient and the rotation in northing direction coefficient respectively. These additional easting and northing shifting coefficients are then added respectively to the shift in easting direction coefficient and the shift in northing direction coefficient of the transformation coefficients.

In an embodiment of the invention, the map of assets is first divided into geographical sections, preferably in zones, subzones and strips, for minimizing rotation discrepancies, where the steps of obtaining transformation coefficients, generating simplified transformation coefficients and adding the additional directional coefficients are conducted for each one of the zones taken separately/independently of the others.

In an embodiment of the invention, the method further comprises providing user access to the generated map of assets based on the second projection system. Preferably, the method further comprises generating a visual representation of the new map of assets representation based the second projection system and providing user access comprises enabling the visual representation of the map of assets on a user interface such as a computer display.

In an embodiment of the invention, the method and/or steps executed by the processor of the system further comprises generating and submitting an approval request to the municipality for review and approval in accordance with the municipality requirements comprising the new map of assets representation generated based on the second projection system. In this case, preferably the first projection system is the local/terrestrial projection system and the second projection system is the satellite projection system, In an embodiment of the invention, the method and/or steps executed by the processor of the system further comprises generating a development infrastructure or ultrastructure network plan by a development company using the new map of assets representation generated based on the second projection system. In this case, preferably, the first projection system is the satellite projection system and the second projection system is the satellite projection system.

This together with the other aspects of the present invention along with the various features of novelty that characterized the present disclosure is pointed out with particularity in claims annexed hereto and forms a part of the present invention. For better understanding of the present disclosure, its operating advantages, and the specified objective attained by its uses, reference should be made to the accompanying descriptive matter in which there are illustrated exemplary embodiments of the present invention.

BRIEF DESCRIPTION OF THE DRAWINGS

The advantages and features of the present disclosure will become better understood with reference to the following detailed description and claims taken in conjunction with the accompanying drawing, in which:

FIG. 4 illustrates projection parameters of the terrestrial and satellite systems used for the implementation of the present invention according to an example of implementation of the present invention;

DETAILED DESCRIPTION OF THE DISCLOSURE

The foregoing descriptions of specific embodiments of the present disclosure have been presented for purposes of illustration and description. They are not intended to be exhaustive or to limit the invention to the precise forms disclosed, and obviously many modifications and variations are possible in light of the above teaching. The exemplary embodiment was chosen and described in order to best explain the principles of the invention and its practical application, to thereby enable others skilled in the art to best utilize the invention and various embodiments with various modifications as are suited to the particular use contemplated.

The terms "a" and "an" herein do not denote a limitation of quantity, but rather denote the presence of at least one of the referenced item.

The terms "having", "comprising", "including", and variations thereof signify the presence of a component in the list but may include other unnamed elements.

There is provided a system and method of transforming an existing map of assets from a first projection system to a second projection system. The method is a computer implemented method.

The representation of an area or location on earth is performed by using coordinates X and Y. In some occasions, the Z coordinate is also used. The system and method of the present invention are adapted to apply for transforming a 2 dimensional or 3 dimensional map of assets. Though the explanations and examples in this application will be limited to 2 dimensional only (X, Y), this should not be construed as a limitation to the present invention and the present invention applies equally for the conversion of three dimensional coordinates.

Figure 1:
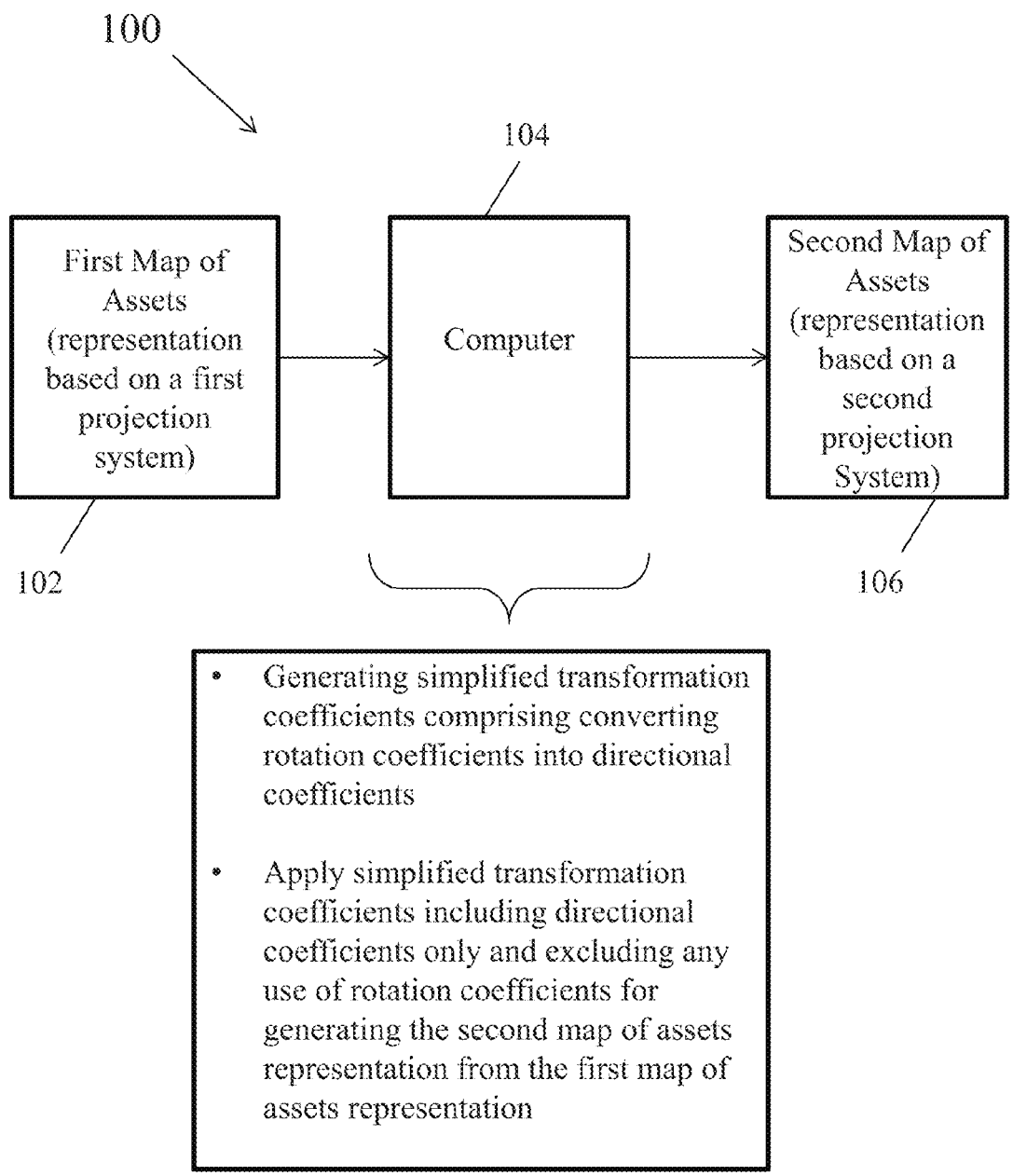
FIG. 1 illustrates a system comprising a processing unit adapted to transform a map of assets based on a first projection system into a map of assets based on a second projection system in accordance with an embodiment of the invention.

Referring to FIG. 1, there is provided a system 100 for transforming a first map of assets based on a first projection system to a second map of assets based on a second projection system, the system comprising a computer 104. Initially, the computer 104 receives a map of assets representation based on the first projection system 102 represented by first projection coordinates of geographical areas (for example, zones, sub zones and strips).

In an embodiment of the invention, the first projection system is the satellite projection system and the second projection system is the local/terrestrial projection system. In an example of implementation of the present invention, as illustrated in FIG. 4, the local/terrestrial projection system is Clarke 1880 and the satellite projection system is WGS84.

The computer 104 is adapted to obtain transformation coefficients for transforming the satellite projection coordinates into local/terrestrial projection coordinates. These transformation coefficients are known a priori and are preferably stored inside a memory of the computer 104. The transformation coefficients comprise first directional coefficients, rotation coefficients and a scale. The first directional coefficients comprise an X directional coefficient and a Y directional coefficient. The rotations coefficients comprise an X rotation coefficient and a Y rotation coefficient.

The computer 104 is further adapted to process the transformation coefficients where the rotation coefficients are converted into additional directional coefficients. The X rotation coefficient is converted into an additional X directional coefficient and the Y rotation coefficient is converted into an additional Y directional coefficient. The process of converting the rotation coefficients into additional directional coefficients is explained below.

The computer 104 is further adapted to add the additional X and Y directional coefficients respectively to the first directional coefficients X and Y for generating second directional coefficients X and Y respectively. Simplified transformation coefficients are generated using the second directional coefficients and by eliminating the rotation coefficients. The scale is preferably set to 1 in the preferred embodiment. The resulting simplified transformation units do not include any rotation or scale coefficients.

The computer 104 is further adapted to convert the satellite projection coordinates into local/terrestrial projection coordinates using the simplified transformation coefficients for generating and outputting a second map of assets based on the local/terrestrial projection system 106. The computer 104 is further adapted to generate and provide user access to the second map of assets representing the strips, sub zones and zones based on the local/terrestrial projection system.

Figure 5:
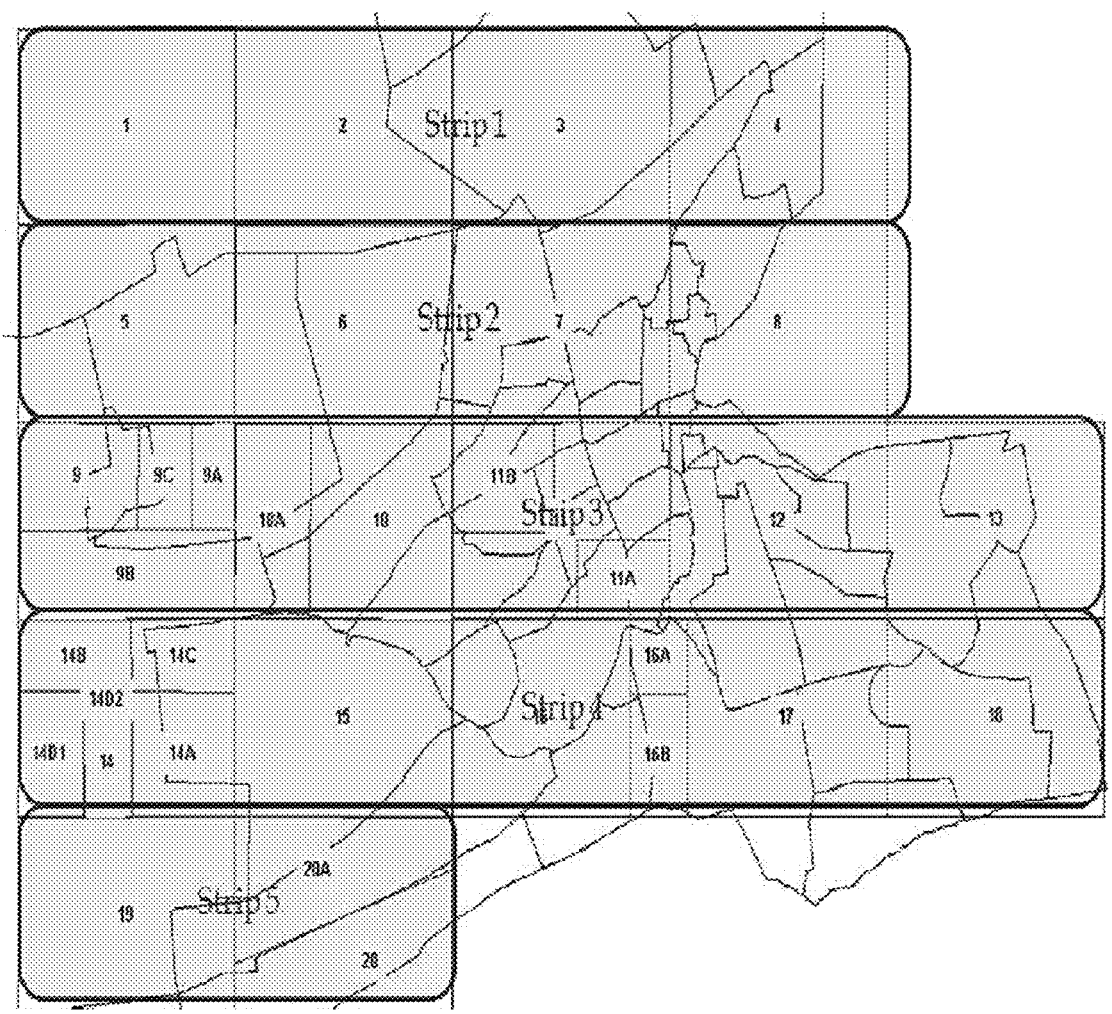
FIG. 5 illustrates an example of dividing a city into strips, main zones and sub zones in accordance with an embodiment of the invention.
Figure 6A:
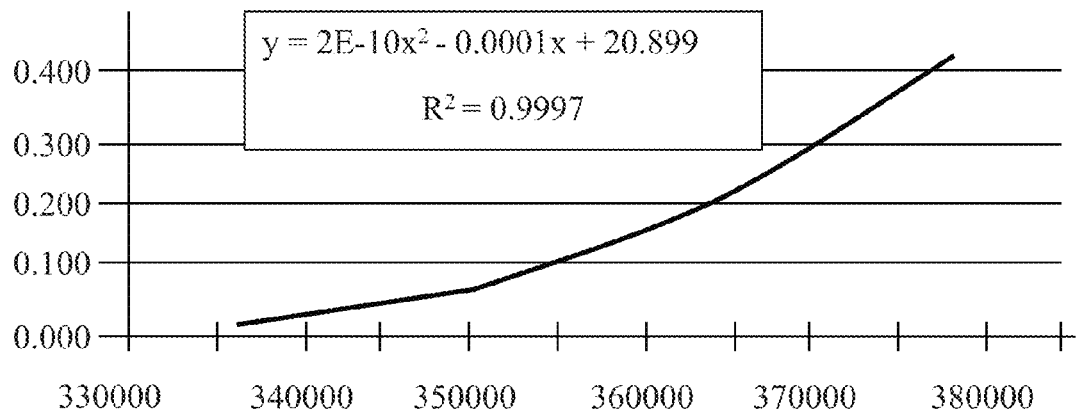
FIG. 6a illustrates the X directional shift coefficient obtained using the Least Square Adjustment Module for Strip 1 according to an example of implementation of the present invention.
Figure 6B:
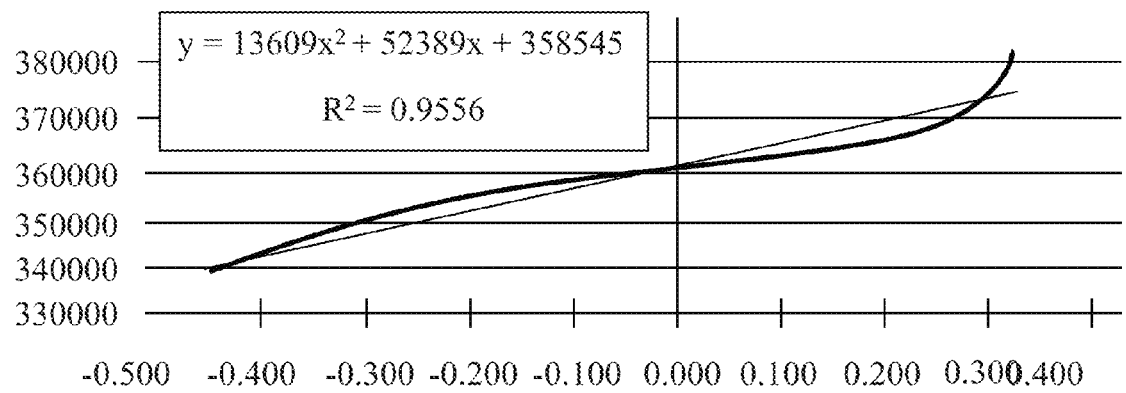
FIG. 6b illustrates the X directional shift coefficient obtained using the Least Square Adjustment Module for Strip 1 according to an example of implementation of the present invention.
Figure 6C:
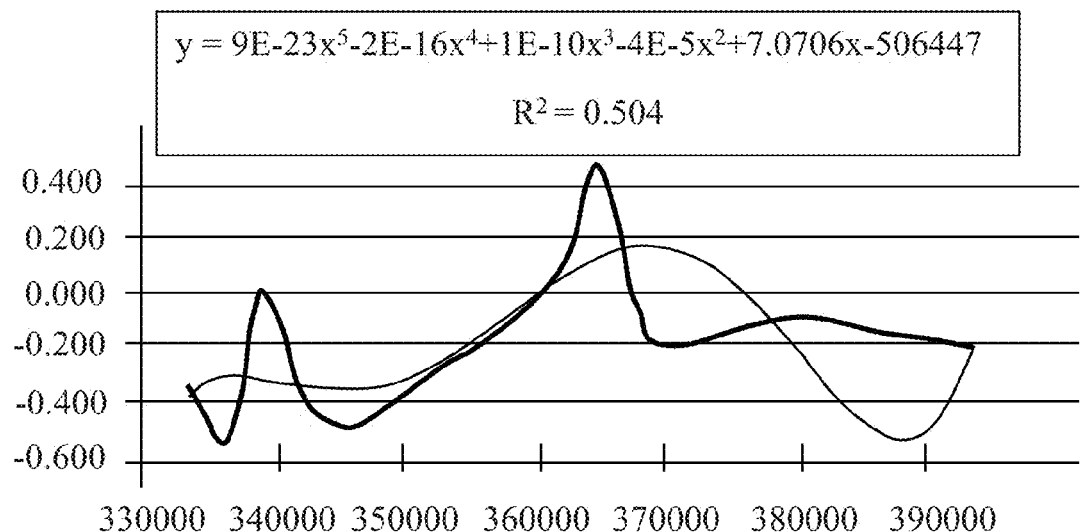
FIG. 6c illustrates the X directional shift coefficient obtained using the Least Square Adjustment Module for Strip 1 according to an example of implementation of the present invention.
Figure 6D:
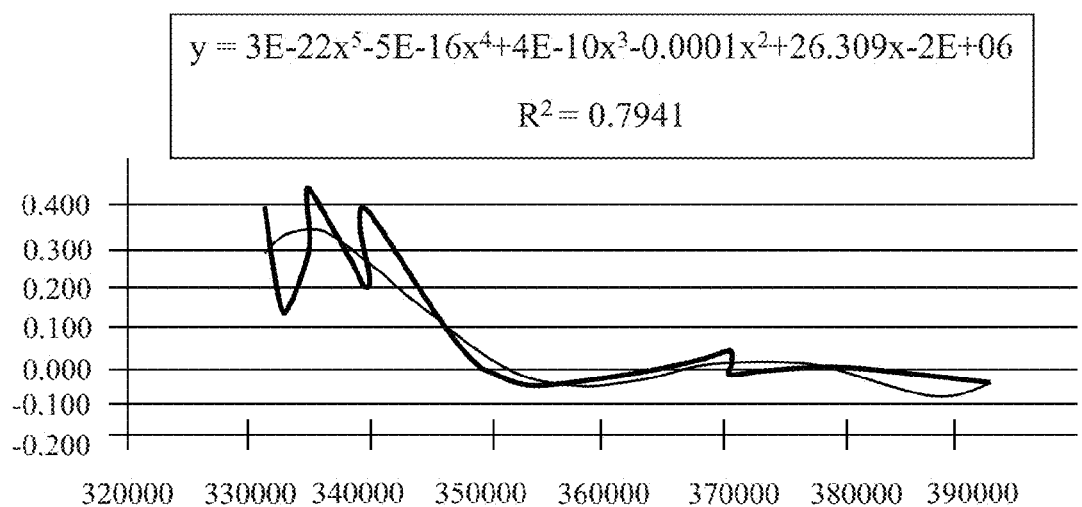
FIG. 6d illustrates the X directional shift coefficient obtained using the Least Square Adjustment Module for Strip 1 according to an example of implementation of the present invention.

As illustrated in FIG. 5, in an embodiment of the invention, the computer 104 is adapted to enable the division of the first map of assets into geographical sections in such a manner for minimizing rotation discrepancies within the same geographical section. Preferably, the geographical sections are strips comprising geographical coordinates having the same rotation coefficients. In this sense, the selection of strips is based on the geographical areas having the same (or substantially the same) rotation coefficients. This allows for having uniform rotation coefficients within the same strip.

In another embodiment of the invention, the geographical sections comprise strips, subzones and zones. Subzones are formed with strips having a discrepancy rotation coefficient value less than a certain threshold. The zones comprise subzones where the discrepancy between rotation coefficients is above that threshold.

The generation of the simplified transformation coefficients and the process of converting the first map of assets (based on the first projection system) into the second map of assets (based on the second projection system) are conducted for each one of the geographical sections separately/independently. In the preferred embodiment where the geographical sections are strips, the simplified transformation coefficients are generated for each strip independently. The rotation coefficient being uniform across the strip, the same mathematical relationship/conversion equation between rotation coefficients and additional directional coefficients is applied for all the coordinates within the same strip. This allows achieving better accuracy results.

Though the computer 104 has been described above with respect to the transformation of a map of assets from the satellite projection system into a local/terrestrial projection system, the computer 104 is also adapted to transform a map of assets from a local/terrestrial projection system into the satellite projection system using the same processes described herein.

Figure 2:
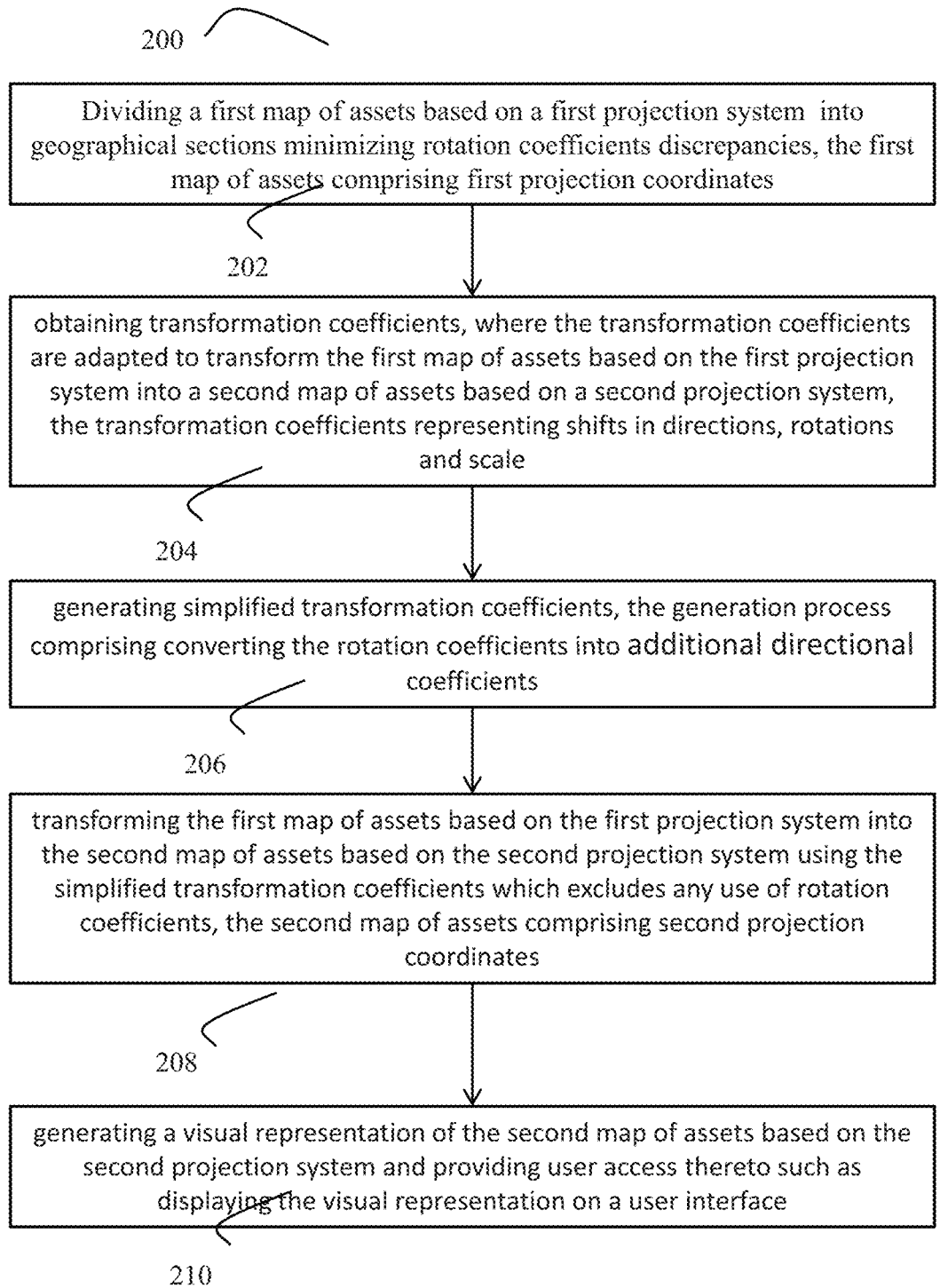
FIG. 2 is a flow chart illustrating a method of transforming a map of assets based on a first projection system into a map of assets based on a second projection system in accordance with an embodiment of the invention.

Referring to FIG. 2, the method of conversion 200 comprises as a first step the first map of assets based on the first projection system into geographical sections minimizing rotation coefficient discrepancies, the representation comprising first projection coordinates (202). Preferably, the minimization of rotation coefficients discrepancies comprise selecting the geographical coordinates having the same or substantially the same rotation coefficients and grouping them in strips for forming the geographical sections.

The method 200 further comprises obtaining transformation coefficients, where the transformation coefficients are adapted to transform the first map of assets based on the first projection system into a second map of assets based on the second projection system, the transformation coefficients representing shifts in directions, rotations and scale (204).

The method 200 further comprises generating simplified transformation coefficients, the generation process comprising converting the rotation coefficients into additional directional coefficients (206).

The method 200 further comprises transforming the first map of assets based first projection system into a second map of assets based on the second projection system using the simplified transformation coefficients which excludes any use of rotation coefficients, the map of assets representation based on the second projection system being represented by second projection coordinates (208). Preferably, the scale is set to one and therefore eliminated as well.

The method 200 preferably further comprises generating a visual representation of the second map of assets and providing user access thereto such as displaying the second map on a user interface (210).

Figure 3:
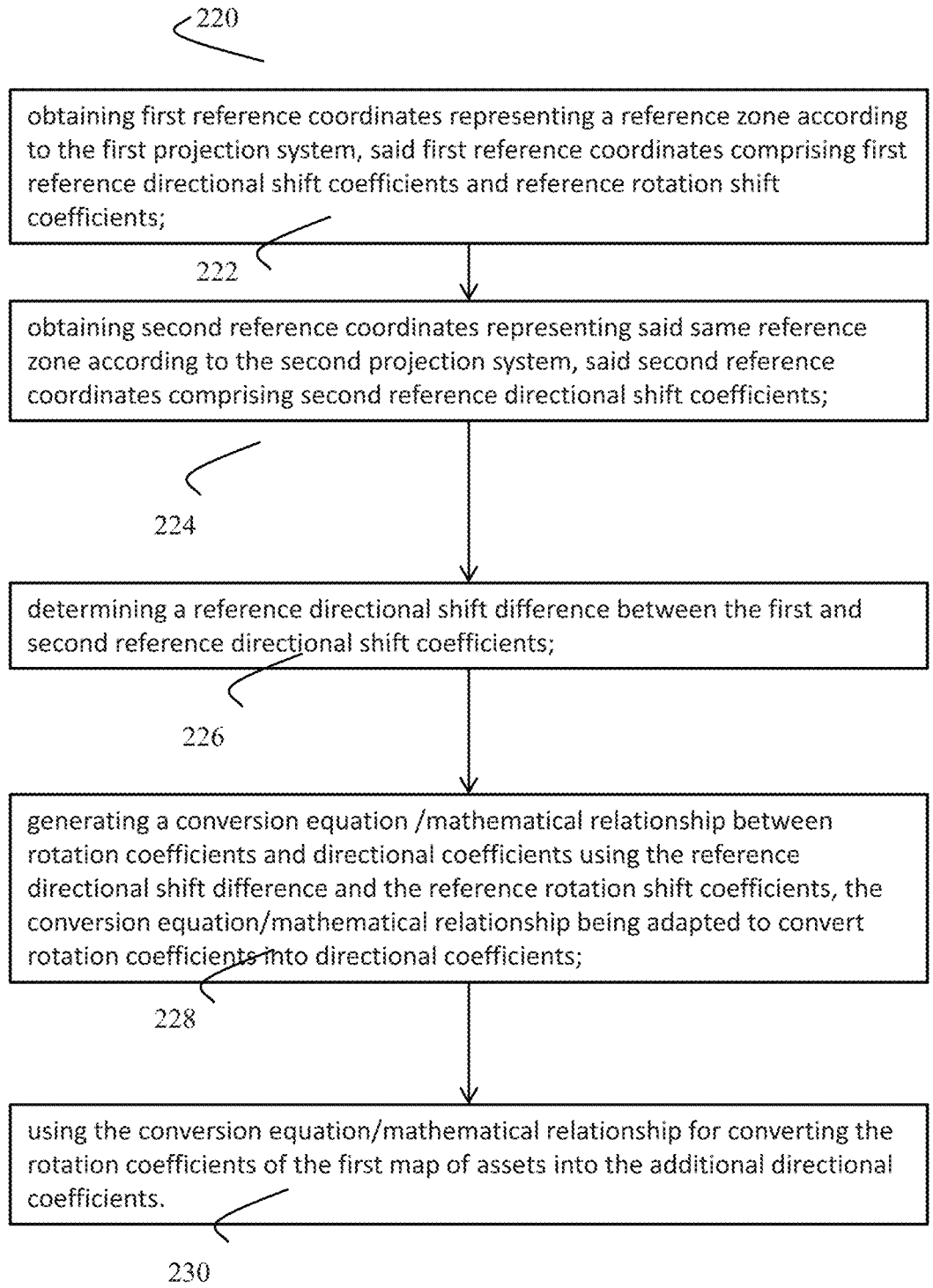
FIG. 3 is a flow chart illustrating a method of converting the rotation coefficients into additional directional coefficients in accordance with an embodiment of the invention.

As illustrated in FIG. 3, the conversion of the rotation coefficients into additional directional coefficients 220 comprises the steps of:
  obtaining first reference coordinates representing a reference zone based on the first projection system, said first reference coordinates comprising first reference directional shift coefficients and reference rotation shift coefficients (222);
  obtaining second reference coordinates representing said same reference zone based on the second projection system, said second reference coordinates comprising second reference directional shift coefficients (224);
  determining the difference (a reference directional shift difference) between the first and second reference directional shift coefficients (226);
  generating a conversion equation/mathematical relationship between rotation coefficients and directional coefficients using the reference directional shift difference and the reference rotation shift coefficients, the conversion equation/mathematical relationship being adapted to convert rotation coefficients into directional coefficients (228); and
  using the conversion equation/mathematical relationship for converting the rotation coefficients into the additional directional coefficients (230).

The conversion of the rotation coefficients into directional coefficients reduces the complexity and time of mathematical computations and leads to an enhanced efficiency and accuracy in the transformation of the map of assts.

The first and second reference coordinates are preferably stored inside a memory of the computer and obtained automatically by the processing unit of the computer.

The reference directional shift difference determined is the equivalent (in angles) of the reference rotation shift coefficients. The normalization of the mathematical relationship between the reference directional shift difference and the reference rotation shift coefficients can be use for the generation of the conversion equation/mathematical relationship model.

In an embodiment of the invention, the directional coefficients comprise a shift in easting direction coefficient and a shift in northing direction coefficient.

In an embodiment of the invention, the rotation coefficients comprise a rotation in easting direction coefficient and a rotation in northing direction coefficient. Once these rotation coefficients are converted into directional coefficients, the resulting additional directional coefficients comprise an additional easting shifting coefficient and an additional northing shifting coefficient which reflect the rotation in easting direction coefficient and the rotation in northing direction coefficient respectively. These additional easting and northing shifting coefficients are then added respectively to the shift in easting direction coefficient and the shift in northing direction coefficient of the transformation coefficients.

In an embodiment of the invention, the map of assets is first divided into strips for minimizing rotation discrepancies, where the steps of obtaining transformation coefficients, generating simplified transformation coefficients and adding the additional directional coefficients are conducted for each one of the strips taken separately.

In an embodiment of the invention, the method further comprises generating a visual representation of the new map of assets representation based on the second projection system and displaying the visual representation on a user interface such as a computer display (210).

In an embodiment of the invention, the first projection system is the local/terrestrial projection system and the second projection system is the satellite projection system, and the method and/or steps executed by the processor of the system further comprises generating and submitting an approval request to an administrative authority such as the municipality for review and approval in accordance with the administrative authority requirements comprising the second map of assets based on the second projection system.

In an embodiment of the invention, the first projection system is the satellite projection system and the second projection system is the satellite projection system, and the method and/or steps executed by the processor of the system further comprises generating a development infrastructure or ultrastructure network plan by a development company using the second map of assets representation based on the second projection system.

In an embodiment of the invention, the method 200 further comprises and the computer 104 is further adapted for generating a visual representation of the second map of assets based on the second projection system and displaying the visual representation on a user interface.

The plan transformation is a composition of two functions: a transformation and a linear surface. Ordinary vector algebra uses matrix multiplication to model vectors and linear surfaces for figuration of surface transformation. Formally, in the finite-dimensional modeling, if the linear surface is represented as a multiplication by a matrix A and the transformation as the addition of a vector B, plan transformation f acting on a vector $\bar{x}$ can be represented accordingly.

In an embodiment of the present invention, there exists a map transformation $\varphi$ such that, for any center of two surfaces Z, W∈ to matrix M: G(W)−G(Z)=$\varphi$(W−Z). since O∈M represents the center, and C formulate its surface G(O)∈C, the conclusion of that, any vector $\vec{E}$=G: O+$\vec{E}$→C+$\varphi(\vec{E})$ if the center Ó∈C inside the surface, an affine transformation will be generated in such M→C which concludes O→Ó. Practically the developed plan transformation f decomposed of the 4 displacement parameters required for the map transformation concluded based on, G=O+$\vec{E}$→Ó+$\varphi(\vec{E})$ forms the surface transformation using parameters of vector $\vec{C}=\overrightarrow{OC}$.

The succeeding paragraphs specifically explain an example of implementation according to an embodiment of the present invention, and should not be taken as limitation to the disclosed invention.

FIG. 5 shows an example of dividing a city into strips, subzones and zones reducing rotation coefficients discrepancies. In this case, the city X has been divided in 5 strips, 20 zones and 12 subzones.

According to an embodiment of the invention, the directional shifts of the transformation coefficients between the first and second projection system are generated using a Least Square Adjustment Module. FIGS. 6a, 6b, 6c and 6d show respectively the directional coefficients for each one of the strips 1, 2, 3 and 4. The directional coefficients are expressed as mathematical equations y(x) where y is the geo-location coordinate based on the second projection system and x is the geo-location coordinate based on the first projection system.

As illustrated in FIGS. 6a to 6d, below is a summary of all the mathematical equations being used for the transformation of the coefficients of the present invention:

$$Y=(0.019x^2-1.2609x+20.899)\times10,000$$

$$Y=0.0006x^3-4664.3x^2+1E+10x-1E+16$$

$$Y=13609x^2+52389x+35845$$

$$Y=-0.002x^3+1753.7x^2-5E+09x+4E+15$$

$$Y=(-0.352x^5-4.2991x^4-19.238x^3-37.307x^2+26.351x-267.67)\times10,000$$

$$Y=(0.0085x^5-1.5302x^4+109.93x^3-3944.7x^2+70706x-506447)\times10,000$$

$$Y=(-29905x^5+4E+7x^4-2E+10x^3+6E+12x^2-8E+14x+3E+16)\times10,000$$

$$Y=(0.0301x^5-5.4832x^4+39839x^3-14495x^2+263089x-2E+6)\times10,000$$

Figure 7A:
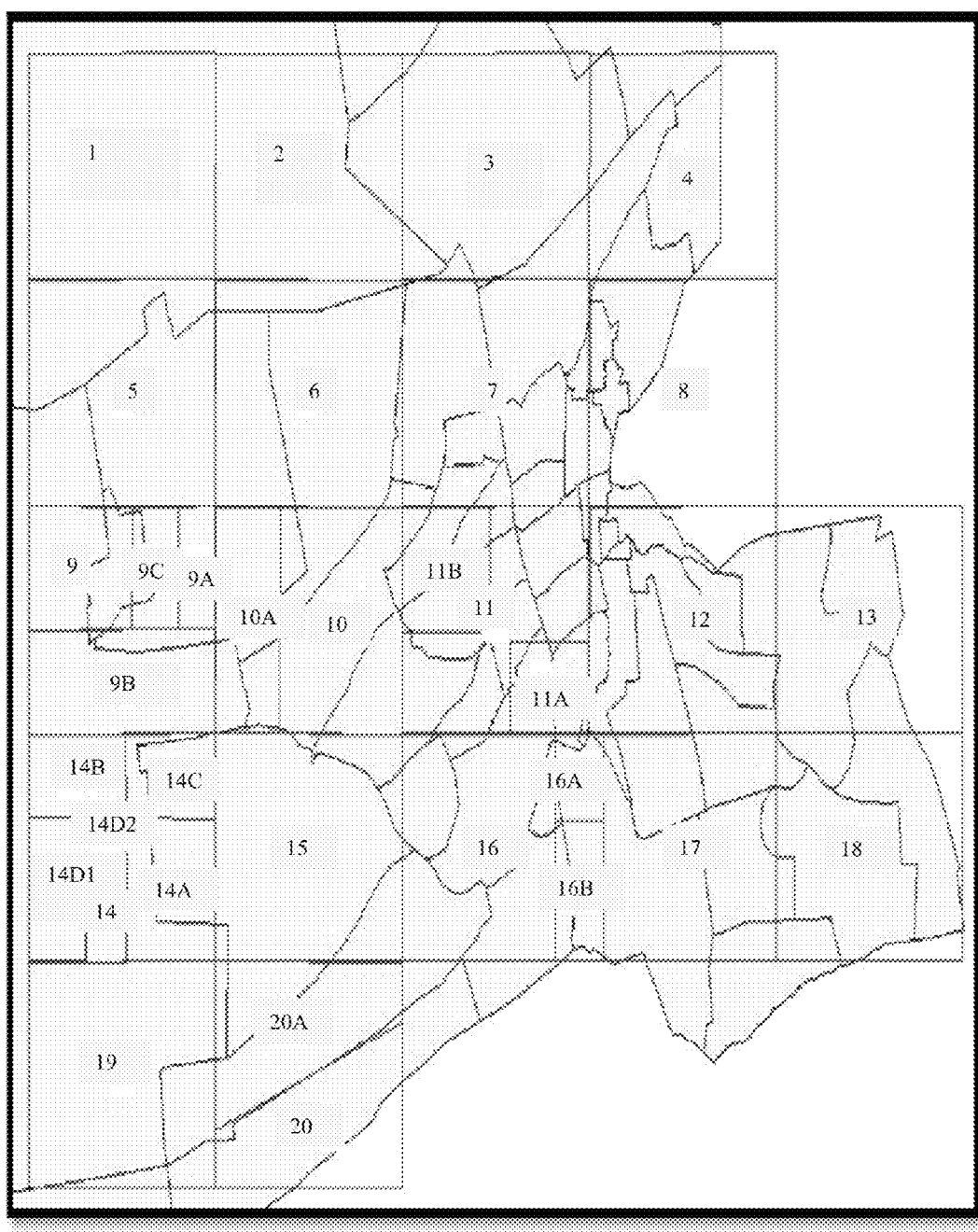
FIG. 7a illustrates a map of assets after conversion based on the second projection system according to an example of implementation of the present invention.

FIG. 7a illustrates the second map of assets after conversion based on the second projection system.

Figure 7B:
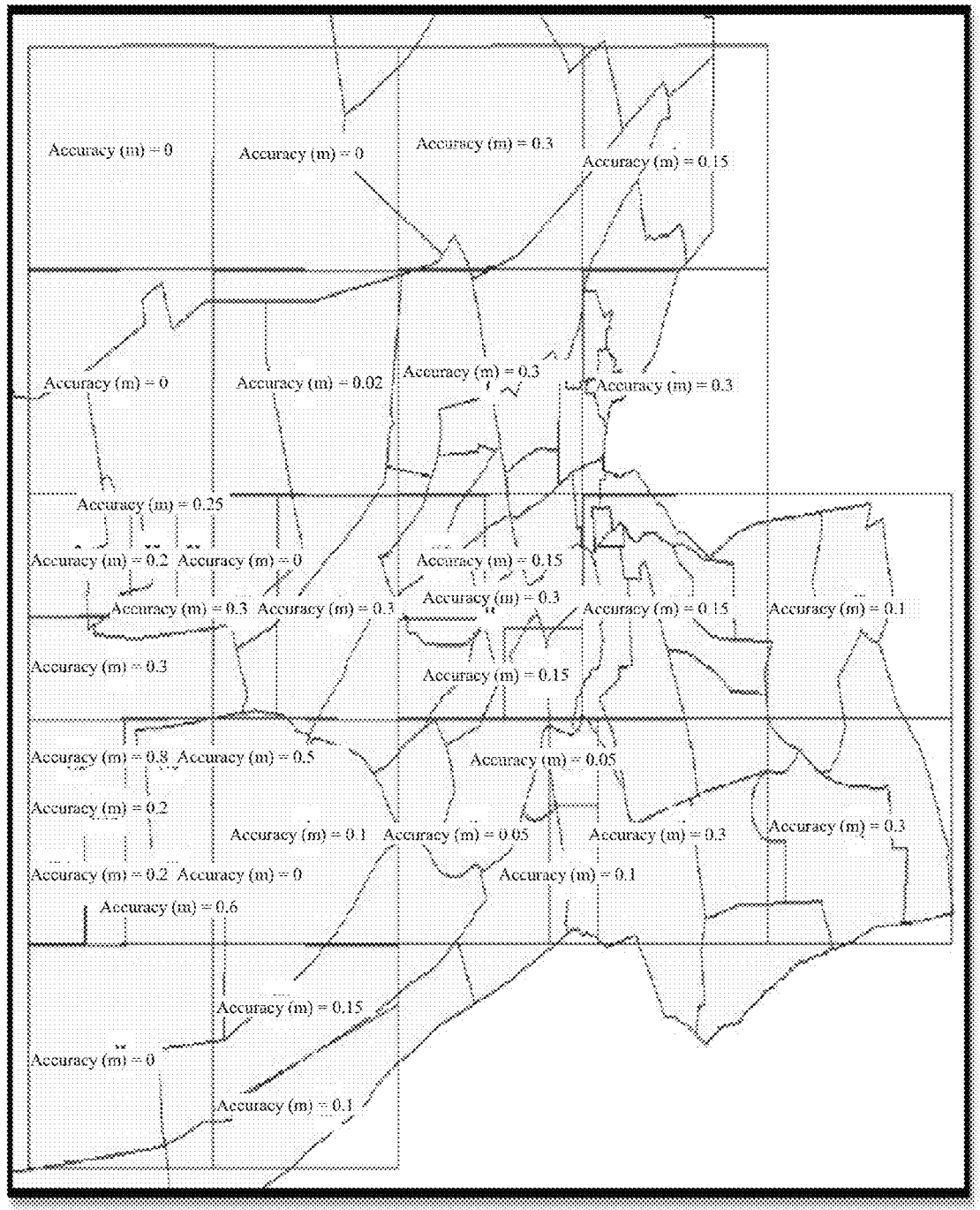
FIG. 7b illustrates the map of assets after conversion based on the second projection system with an indication of accuracy in centimeters according to an example of implementation of the present invention.

FIG. 7b illustrates the second map of assets after conversion based on the second projection system with an indication of accuracy in centimeters according to an example of implementation of the present invention. As it can be seen, the accuracy is in the order of 0-80 centimeter, with accuracy for most of the strips below 25 centimeter which is a substantial enhancement of accuracy over any existing system.

Figure 7C:
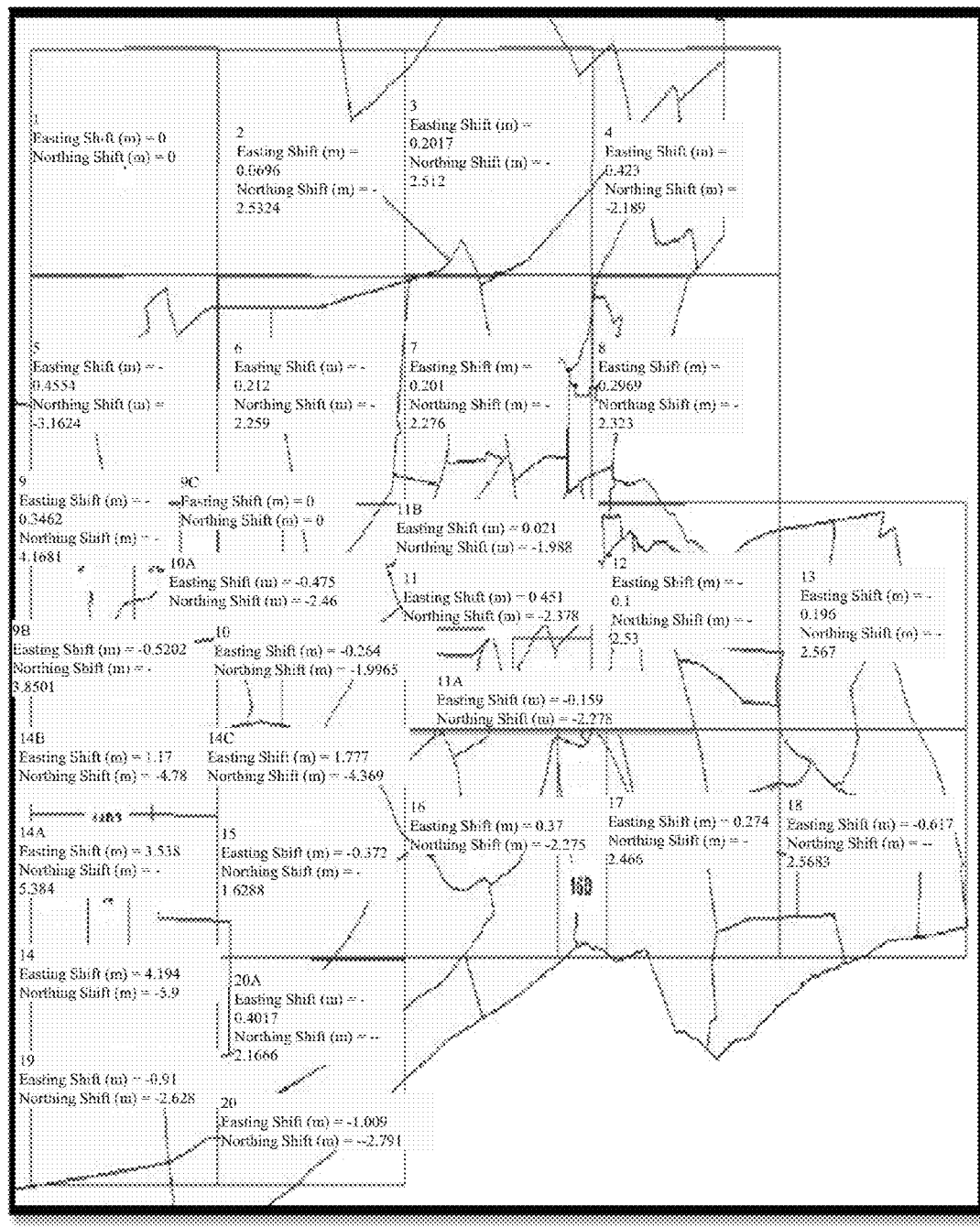
FIG. 7c illustrates the map of assets after conversion based on the second projection system with an indication of discrepancy in the X and Y directional coefficients according to an example of implementation of the present invention.

FIG. 7c illustrates the map of assets after conversion based on the second projection system with an indication of discrepancy in the X and Y directional coefficients according to an example of implementation of the present invention.

The system 100, as described in the disclosed teachings or any of its components, may be embodied in the form of a computer system. Typical examples of a computer system include a general-purpose computer, a PDA, a cell phone, a programmed microprocessor, a micro-controller, a peripheral integrated circuit element, and other devices or arrangements of devices that are capable of implementing the steps that constitute the method of the disclosed teachings.

The method and system as disclosed herein have various advantages. Firstly, the present method and system provides a more accurate conversion method. The disclosed system and method eliminates the inconsistent rotation coefficients and compensate it in directional shifts (in this example, in the X and Y directions). The present system and method also provide a more accurate conversion of a map of assets with accurate values of the second projection coordinates for planning a better infrastructure of a particular area and facilitating and accelerating any approval procedures from administrative/legal authorities.

The computer-based data processing system and method described above is for purposes of example only, and may be implemented in any type of computer system or programming or processing environment, or in a computer program, alone or in conjunction with hardware. The present invention may also be implemented in software stored on a computer-readable medium and executed as a computer program on a general purpose or special purpose computer. For clarity, only those aspects of the system germane to the invention are described, and product details well known in the art are omitted. For the same reason, the computer hardware is not described in further detail. It should thus be understood that the invention is not limited to any specific computer language, program, or computer.

The computer may comprise a microprocessor, where the microprocessor is connected to a communication bus. The computer may also include a memory. The memory may include Random Access Memory (RAM) and Read Only Memory (ROM). The computer system further comprises a storage device, which can be a hard disk drive or a removable storage drive such as a floppy disk drive, optical disk drive, and the like. The storage device can also comprise other, similar means for loading computer programs or other instructions into the computer system.

The computer system may comprise a communication device to communicate with a remote computer through a network. The communication device can be a wireless communication port, a data cable connecting the computer system with the network, and the like. The network can be a Local Area Network (LAN) or a Wide Area Network (WAN) such as the Internet and the like. The remote computer that is connected to the network can be a general-purpose computer, a server, a PDA, and the like. Further, the computer system can access information from the remote computer through the network.

It is further contemplated that the present invention may be run on a stand-alone computer system, or may be run from a server computer system that can be accessed by a plurality of client computer systems interconnected over an intranet network, or that is accessible to clients over the Internet. In addition, many embodiments of the present invention have application to a wide range of industries. To the extent the present application discloses a system, the method implemented by that system, as well as software stored on a computer-readable medium and executed as a computer program to perform the method on a general purpose or special purpose computer, are within the scope of the present invention. Further, to the extent the present application discloses a method, a system of apparatus configured to implement the method are within the scope of the present invention.

The foregoing descriptions of specific embodiments of the present invention have been presented for purposes of illustration and description. They are not intended to be exhaustive or to limit the present invention to the precise forms disclosed, and obviously many modifications and variations are possible in light of the above teaching.

The embodiments were chosen and described in order to best explain the principles of the present invention and its practical application, and to thereby enable others skilled in the art to best utilize the present invention and various embodiments with various modifications as are suited to the particular use contemplated. It is understood that various omissions and substitutions of equivalents are contemplated as circumstances may suggest or render expedient, but such omissions and substitutions are intended to cover the application or implementation without departing from the spirit or scope of the present invention.

What is claimed is:

1. A computer-implemented coordinate conversion method for converting a first map of assets represented by first map coordinates based on a first projection system to a second map of assets represented by second map coordinates based on a second projection system, the method comprising:
   obtaining transformation coefficients comprising first directional coefficients and rotation coefficients;
   converting the rotation coefficients into second directional coefficients;
   generating simplified transformation coefficients by adding the first and second directional coefficients and eliminating the rotation coefficients;
   generating the second map coordinates by converting the first map coordinates using the simplified transformation coefficients without any use of rotation coefficients;
   generating the second map of assets based on the second projection system using the second map coordinates; and
   providing user access to the generated map.

2. The coordinate conversion method of claim 1 wherein the first projection system is a satellite projection system and the second projection system is a local or terrestrial projection system.

3. The coordinate conversion method of claim 1 wherein the first projection system is a local or terrestrial projection system and the second projection system is a satellite projection system.

4. The coordinate conversion method of claim 1 further comprising dividing the first map of assets into geographical sections for reducing rotation coefficients, and wherein:
   the step of obtaining transformation coefficients comprises obtaining transformation coefficients respectively for each one of the geographical sections;
   the step of converting the rotation coefficients into second directional coefficients is conducted respectively for each one of the geographical sections independently;
   the step of generating simplified transformation coefficients by adding the first and second directional coefficients and eliminating the rotation coefficients is conducted respectively for each one of the geographical sections independently;
   the step of generating the second map coordinates is conducted respectively for each one of the geographical sections independently; and
   the step of generating the second map of assets comprises combining the second map coordinates of each one of the geographical sections for forming the second map of assets.

5. The coordinate conversion method of claim 4 wherein the geographical sections comprises geographical zones, subzones and strips.

6. The coordinate conversion method of claim 1 wherein the step of converting the rotation coefficients into second directional coefficients comprises:
   obtaining first reference coordinates representing a reference zone based on the first projection system, said first reference coordinates comprising first reference directional coefficients and reference rotation shift coefficients;
   obtaining second reference coordinates representing said same reference zone based on the second projection system, said second reference coordinates comprising second reference directional coefficients;
   determining a reference directional difference between the first and second reference directional coefficients;
   determining a mathematical relationship between rotation coefficients and directional coefficients using the reference directional coefficients difference and the reference rotation coefficients, the mathematical relationship being adapted to convert the rotation coefficients of the transformation coefficients obtained into the additional directional coefficients;
   converting the rotation coefficients of the transformation coefficients into the additional directional coefficients using the mathematical relationship.

7. The coordinate conversion method of claim 1 wherein each one of the rotation coefficients, the directional coefficients and the additional directional coefficients comprises two orthogonal components, a first component along a first axis and a second component along a second axis orthogonal to the first axis.

8. The coordinate conversion method of claim 7 where the first axis is an X axis and the second axis is a Y axis.

9. The coordinate conversion method of claim 8 wherein the first component represents a shift in easting direction and the second components represent a shift in northing direction.

10. The coordinate conversion method of claim 1 further comprising generating and submitting an approval request to an administrative authority server for review and approval, the approval request comprising the second map of assets generated based on the second projection system.

11. The coordinate conversion method of claim 1 further comprising generating an infrastructure or ultrastructure plan based on the second map of assets generated based on the second projection system.

12. A computing device for converting a first map of assets represented by first map coordinates based on a first projection system to a second map of assets represented by second map coordinates based on a second projection system, the method comprising:
   obtaining transformation coefficients comprising first directional coefficients and rotation coefficients;
   converting the rotation coefficients into second directional coefficients;
   generating simplified transformation coefficients by adding the first and second directional coefficients and eliminating the rotation coefficients;
   generating the second map coordinates by converting the first map coordinates using the simplified transformation coefficients without any use of rotation coefficients;
   generating the second map of assets based on the second projection system using the second map coordinates; and
   providing user access to the generated map.

13. The computing device of claim 12 wherein the first projection system is a satellite projection system and the second projection system is a local or terrestrial projection system.

14. The computing device of claim 12 wherein the first projection system is a local or terrestrial projection system and the second projection system is a satellite projection system.

15. The computing device of claim 12 further comprising dividing the first map of assets into geographical sections for reducing rotation coefficients, and wherein:
   the step of obtaining transformation coefficients comprises obtaining transformation coefficients respectively for each one of the geographical sections;
   the step of converting the rotation coefficients into second directional coefficients is conducted respectively for each one of the geographical sections independently;
   the step of generating simplified transformation coefficients by adding the first and second directional coefficients and eliminating the rotation coefficients is conducted respectively for each one of the geographical sections independently;
   the step of generating the second map coordinates is conducted respectively for each one of the geographical sections independently; and
   the step of generating the second map of assets comprises combining the second map coordinates of each one of the geographical sections for forming the second map of assets.

16. The computing device of claim 15 wherein the geographical sections comprises geographical zones, subzones and strips.

17. The computing device of claim 12 wherein the step of converting the rotation coefficients into second directional coefficients comprises:
   obtaining first reference coordinates representing a reference zone based on the first projection system, said first reference coordinates comprising first reference directional coefficients and reference rotation shift coefficients;
   obtaining second reference coordinates representing said same reference zone based on the second projection system, said second reference coordinates comprising second reference directional coefficients;
   determining a reference directional difference between the first and second reference directional coefficients;
   determining a mathematical relationship between rotation coefficients and directional coefficients using the reference directional coefficients difference and the reference rotation coefficients, the mathematical relationship being adapted to convert the rotation coefficients of the transformation coefficients obtained into the additional directional coefficients;
   converting the rotation coefficients of the transformation coefficients into the additional directional coefficients using the mathematical relationship.

18. The computing device of claim 12 wherein each one of the rotation coefficients, the directional coefficients and the additional directional coefficients comprises two orthogonal components, a first component along a first axis and a second component along a second axis orthogonal to the first axis.

19. The computing device of claim 18 where the first axis is an X axis and the second axis is a Y axis.

20. The computing device of claim 19 wherein the first component represents a shift in easting direction and the second components represent a shift in northing direction.

21. The computing device of claim 12 further comprising generating and submitting an approval request to an administrative authority server for review and approval, the approval request comprising the second map of assets generated based on the second projection system.

22. The computing device of claim 12 further comprising generating an infrastructure or ultrastructure plan based on the second map of assets generated based on the second projection system.

* * * * *